United States Patent
Duffy

(10) Patent No.: US 11,067,219 B2
(45) Date of Patent: Jul. 20, 2021

(54) FRAME MOUNTABLE BRACKET ASSEMBLY

(71) Applicant: Sean Duffy, Illiopolis, IL (US)

(72) Inventor: Sean Duffy, Illiopolis, IL (US)

( * ) Notice: Subject to any disclaimer, the term of this patent is extended or adjusted under 35 U.S.C. 154(b) by 82 days.

(21) Appl. No.: 16/453,253

(22) Filed: Jun. 26, 2019

(65) Prior Publication Data

US 2020/0408357 A1 Dec. 31, 2020

(51) Int. Cl.
*F16M 13/02* (2006.01)
*A47G 1/00* (2006.01)
*G03B 21/00* (2006.01)

(52) U.S. Cl.
CPC .............. *F16M 13/02* (2013.01); *A47G 1/00* (2013.01); *G03B 21/00* (2013.01)

(58) Field of Classification Search
CPC ......... F16M 13/02; F21V 21/36; F21V 21/38; A47G 7/00; A47G 7/02; A47G 7/04; A47G 7/041; A47G 7/042; A47G 7/044; A47G 7/045; A47G 7/047; A47G 2007/048; A47B 96/061; A47B 96/063; A47B 96/065; A47B 96/066; A47B 96/068; E04G 3/18
USPC ........ 248/238, 235, 247, 250, 320, 321, 322
See application file for complete search history.

(56) References Cited

U.S. PATENT DOCUMENTS

| | | | |
|---|---|---|---|
| 1,541,687 A | 6/1928 | Cory | |
| 3,695,569 A * | 10/1972 | Pullan | A47B 96/061 248/235 |
| 4,098,483 A * | 7/1978 | Pesola | A47G 7/045 248/216.1 |
| 4,117,630 A * | 10/1978 | Kalas | A01G 9/02 185/5 |
| 4,170,843 A * | 10/1979 | Talwani | A47G 7/045 211/1.53 |
| 4,250,537 A | 2/1981 | Roegner | |
| 4,373,695 A * | 2/1983 | Faris | A47G 7/047 211/115 |
| 5,546,698 A * | 8/1996 | Rock | A47G 7/047 47/39 |
| 5,860,248 A * | 1/1999 | Peters | A01G 9/024 47/67 |
| 6,230,440 B1 * | 5/2001 | Deutsch | A47G 7/041 47/67 |
| 6,793,355 B1 | 9/2004 | Leung | |
| 7,020,999 B1 * | 4/2006 | Stouffer | A47G 7/047 47/67 |
| 8,672,496 B2 | 3/2014 | O'lKane | |
| 9,999,795 B1 | 6/2018 | Jarosz | |
| 10,844,661 B1 * | 11/2020 | Halloran | E06C 7/165 |

(Continued)

*Primary Examiner* — Jonathan Liu
*Assistant Examiner* — Thomas J. Bridges

(57) ABSTRACT

A frame mountable bracket assembly for hanging and rotating a mirror ball includes a cantilever, which comprises a first element that is coupled to and extends perpendicularly from an upper end of a second element. A pair of couplers is coupled singly to the cantilever proximate to the upper end and a lower end of the second element. The pair of couplers is configured to removably couple the cantilever to a frame, such as a portable truss utilized by a disc jockey. A rotator is coupled to the first element distal from the second element. A fastener that is coupled to the rotator is configured to removably couple to an object, such as a mirror ball, so that the rotator is positioned to selectively rotate the object.

9 Claims, 4 Drawing Sheets

(56) References Cited

U.S. PATENT DOCUMENTS

2013/0193287 A1* 8/2013 Murphy ................ A47G 7/045
248/219.1

* cited by examiner

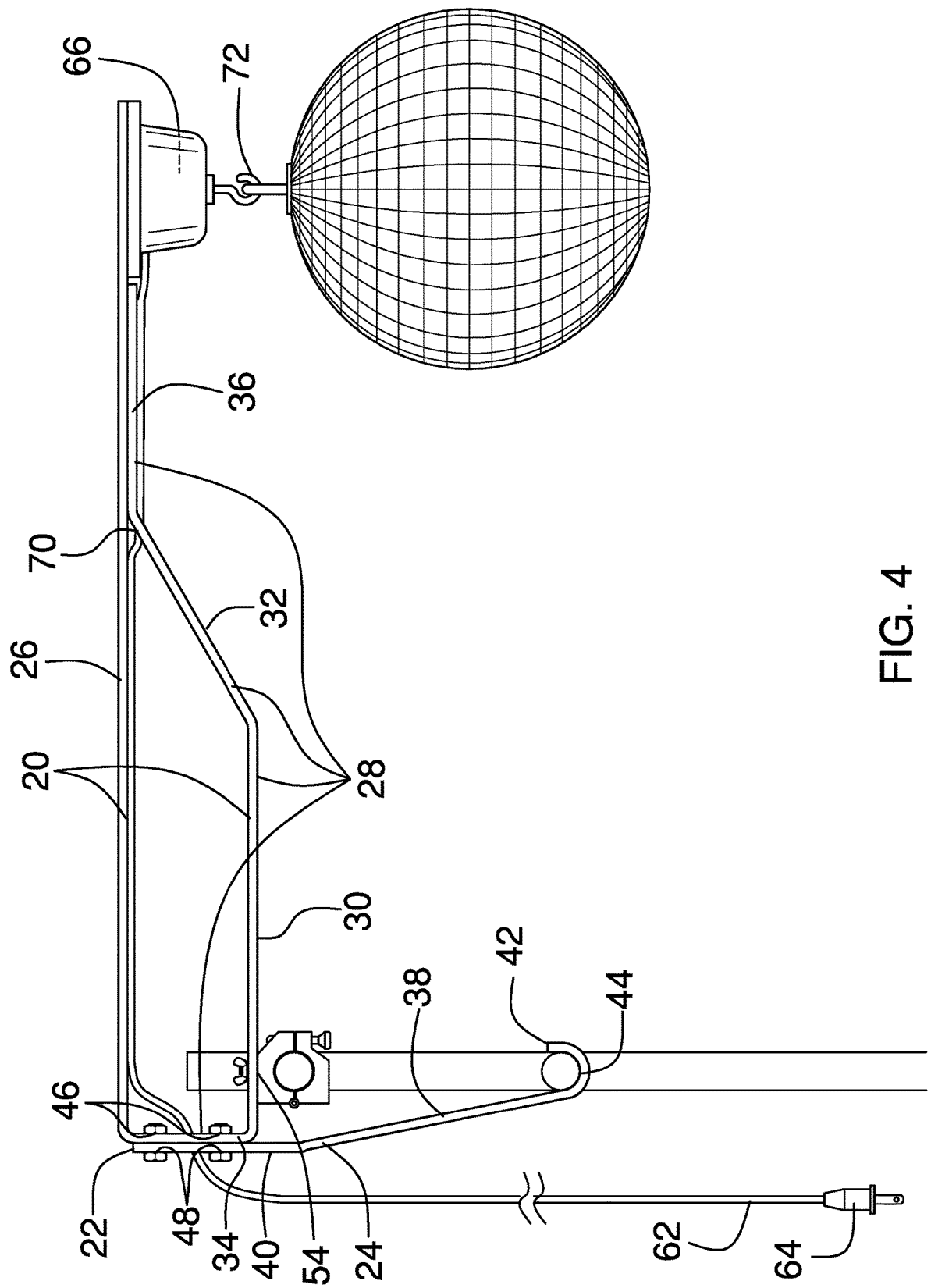

FRAME MOUNTABLE BRACKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to bracket assemblies and more particularly pertain to a new bracket assembly for hanging and rotating a mirror ball.

BRIEF SUMMARY OF THE INVENTION

An embodiment of the disclosure meets the needs presented above by generally comprising a cantilever, which in turn comprises a first element that is coupled to and extends perpendicularly from an upper end of a second element. A pair of couplers is coupled singly to the cantilever proximate to the upper end and a lower end of the second element. The pair of couplers is configured to removably couple the cantilever to a frame, such as a portable truss utilized by a disc jockey. A rotator is coupled to the first element distal from the second element. A fastener that is coupled to the rotator is configured to removably couple to an object, such as a mirror ball, so that the rotator is positioned to selectively rotate the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is an in-use view of an embodiment of the disclosure.

DETAILED DESCRIPTION OF THE INVENTION

Figure 1:
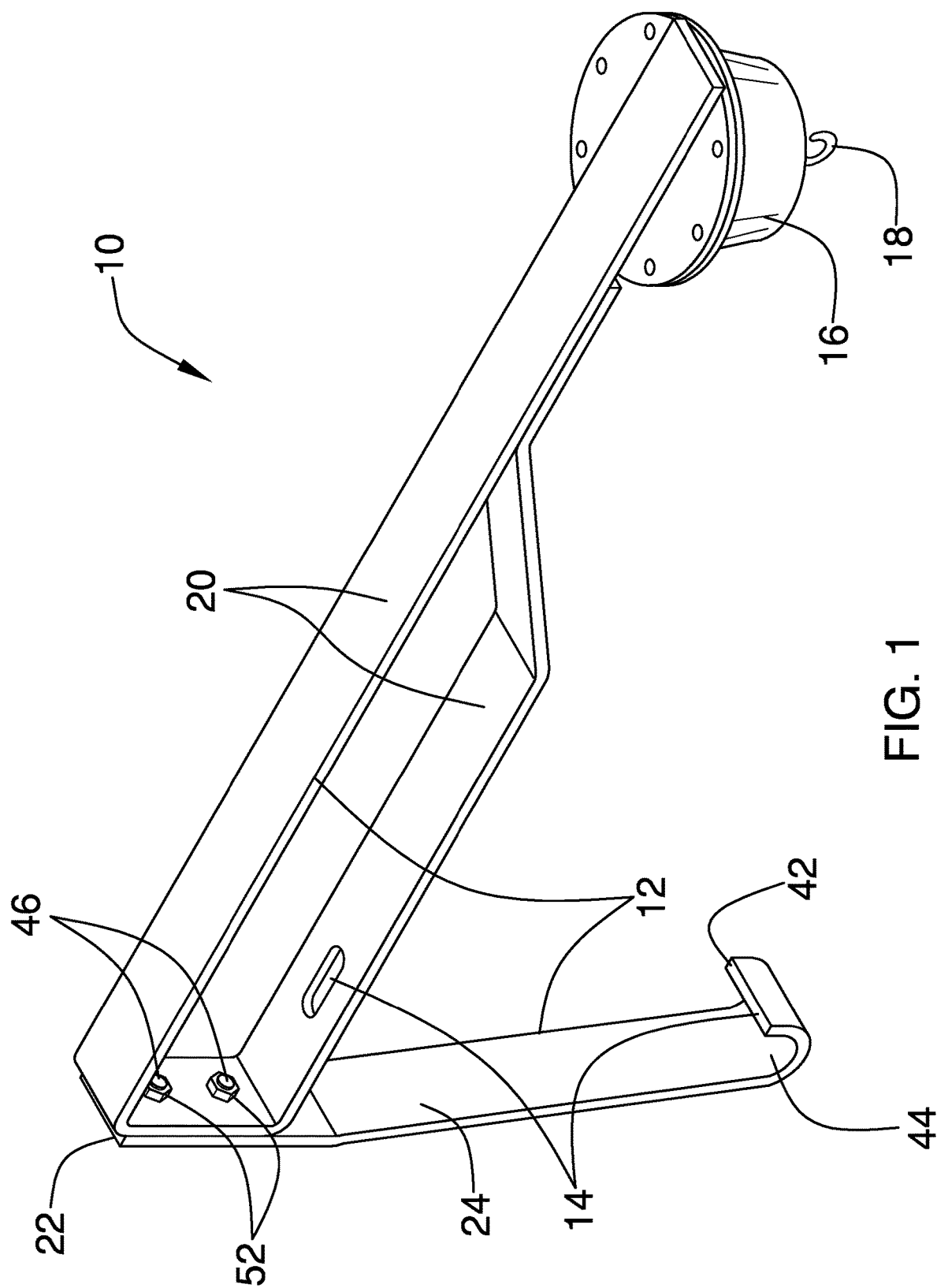
FIG. 1 is a top isometric perspective view of a frame mountable bracket assembly according to an embodiment of the disclosure.

With reference now to the drawings, and in particular to FIGS. 1 through 4 thereof, a new bracket assembly embodying the principles and concepts of an embodiment of the disclosure and generally designated by the reference numeral 10 will be described.

As best illustrated in FIGS. 1 through 4, the frame mountable bracket assembly 10 generally comprises a cantilever 12, a pair of couplers 14, a rotator 16, and a fastener 18. The cantilever 12 comprises a first element 20 that is coupled to and extends perpendicularly from an upper end 22 of a second element 24.

The first element 20 comprises an upper section 26 and a lower section 28. The upper section 26 extends perpendicularly from the upper end 22 of the second element 24. A first segment 30 of the lower section 28 extends perpendicularly from the second element 24 proximate to the upper end 22 of the second element 24. A second segment 32 of the lower section 28 extends transversely from the first segment 30 to the first upper section 26 so that the lower section 28 is positioned to brace the upper section 26.

The lower section 28 also comprises a third segment 34 and a fourth segment 36. The third segment 34 is coupled to and extends between the first segment 30 and the upper section 26 so that the third segment 34 abuts the second element 24. The fourth segment 36 is coupled to and extends from the second segment 32 distal from the first segment 30 so that the fourth segment 36 abuts the upper section 26. The fourth segment 36 is coupled to the upper section 26.

The second element 24 comprises a lower segment 38 that is coupled to and extends transversely from an upper segment 40, as shown in FIG. 4. The second element 24 is arcuate adjacent to a lower end 42 of the second element 24, thus defining a mounting hook 44.

A pair of first holes 46 is positioned in the third segment 34 of the lower section 28. A pair of second holes 48 is positioned in the second element 24 proximate to the upper end 22 so that the second pair of holes is alignable with the pair of first holes 46. Each of a pair of bolts 50 is selectively insertable through a respective second hole 48 and an associated first hole 46. Each of a pair of nuts 52 is selectively couplable to a respective bolt 50 to removably couple the second element 24 to the first element 20.

The pair of couplers 14 is coupled singly to the cantilever 12 proximate to the upper end 22 and the lower end 42 of the second element 24. The pair of couplers 14 is configured to removably couple the cantilever 12 to a frame, such as a portable truss utilized by a disc jockey.

The pair of couplers 14 may comprise a slot 54 and the mounting hook 44, or other coupling means, such as, but not limited to, straps, clamps, bolts, and the like. The slot 54 is positioned in the first segment 30 of the lower section 28 of the first element 20 proximate to the second element 24. The mounting hook 44 is configured to insert a crossmember of the frame and the slot 54 is configured to insert a mounting bolt to couple the cantilever 12 to a mounting clamp that is coupled to the frame. The first element 20 extends substantially horizontally from the frame, as shown in FIG. 4.

The rotator 16 is coupled to the first element 20 distal from the second element 24. The rotator 16 comprises a housing 56 that defines an interior space 58. A power module 60 is coupled to the housing 56 and is positioned in the interior space 58. The power module 60 may comprise a power cord 62 or other power source, such as, but not limited to, batteries and the like. The power cord 62 is coupled to and extends from the housing 56 so that a plug 64 of the power cord 62 is configured to be coupled to a source of electrical current. A motor 66 is coupled to the housing 56 and is positioned in the interior space 58. A shaft 68 of the motor 66 extends through a bottom 74 of the housing 56. The motor 66 is operationally coupled to the power module 60 so that the power module 60 is positioned to selectively power the motor 66 to rotate the shaft 68.

Figure 2:
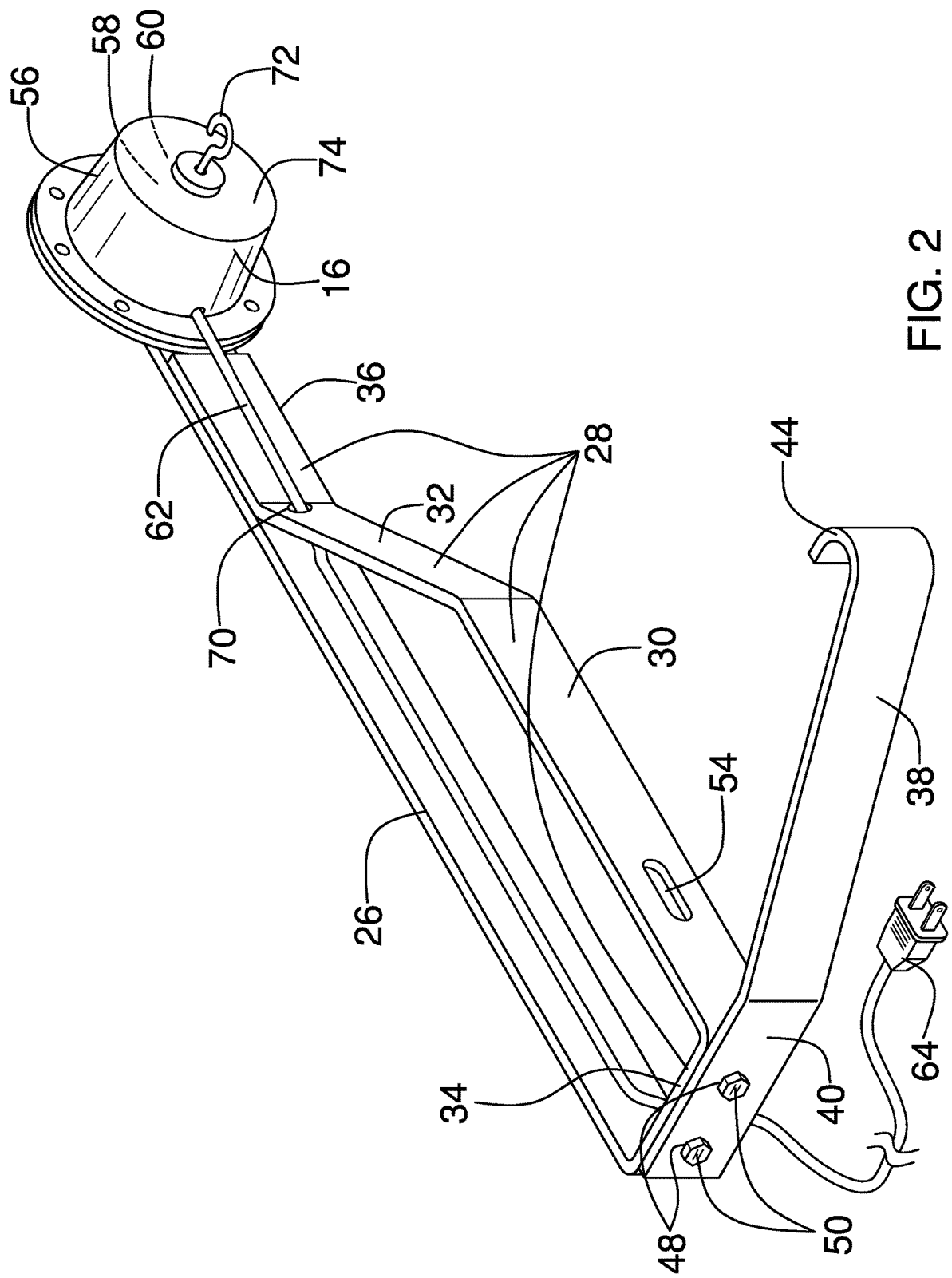
FIG. 2 is a bottom isometric perspective view of an embodiment of the disclosure.
Figure 3:
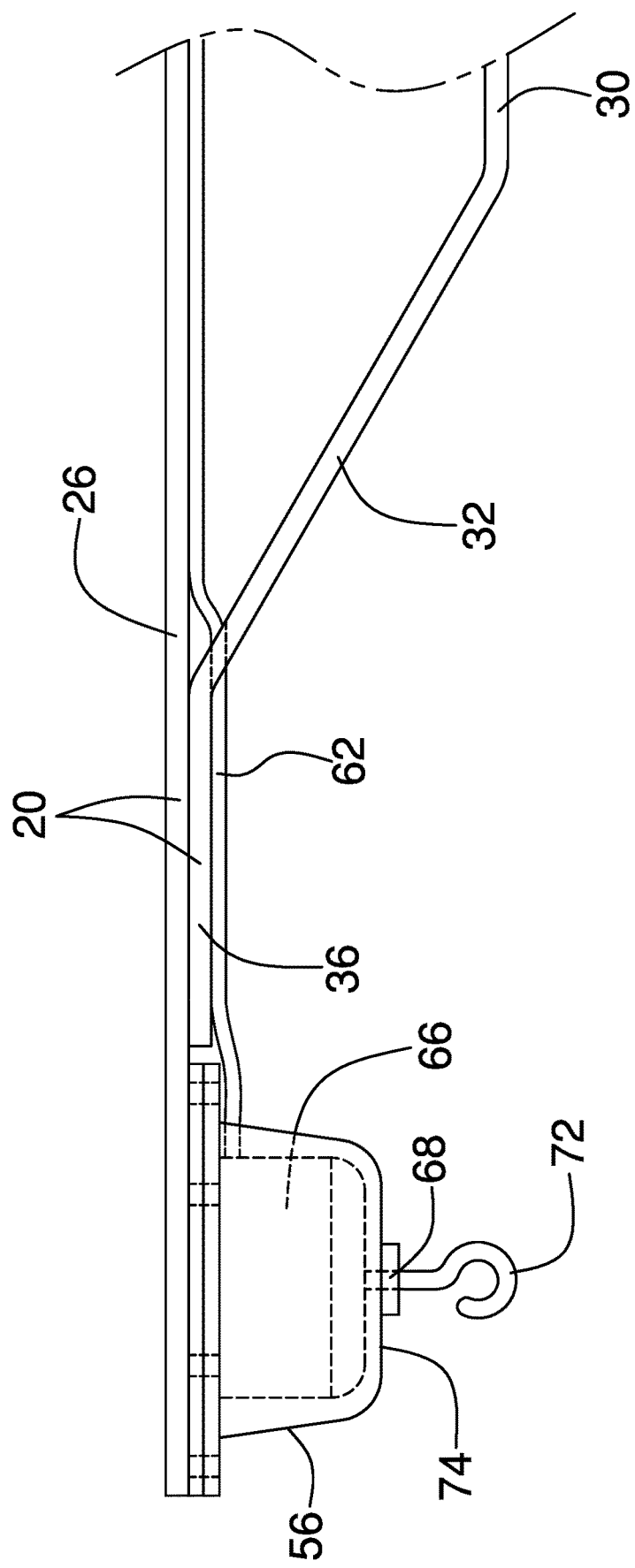
FIG. 3 is a side view of an embodiment of the disclosure.

An orifice 70 is positioned in the second segment 32 of the lower section 28 of the first element 20 proximate to the upper section 26 of the first element 20. The power cord 62 is positioned through the orifice 70, as shown in FIG. 2.

The fastener 18 is coupled to the rotator 16 and is configured to removably couple to an object, such as a mirror ball, so that the rotator 16 is positioned to selectively rotate the object. The fastener 18 may comprise a coupling hook 72 that is coupled to the shaft 68, or other fastening means, such as, but not limited to, clamps, straps, and the like. The coupling hook 72 is configured to selectively couple to a ring that is coupled to the object to removably couple the object to the shaft 68, thus positioning the motor 66 to rotate the object.

In use, the cantilever 12 is positioned on the truss so that the mounting hook 44 engages a crossmember of the truss, as shown in FIG. 4. The slot 54 is positioned in alignment with the mounting clamp, positioning the slot 54 for insertion of the mounting bolt to couple the cantilever 12 to the truss with the first element 20 extending substantially horizontally from the frame. The disc jockey then is positioned to couple the mirror ball to the shaft 68 of the motor 66 using the coupling hook 72. The power cord 62 then is plugged in to an outlet to power the motor 66 to rotate the mirror ball.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A frame mountable bracket assembly comprising:
a cantilever comprising a first element coupled to and extending perpendicularly from an upper end of a second element;
a pair of couplers coupled singly to the cantilever proximate to the upper end and a lower end of the second element wherein the pair of couplers is configured for removably coupling the cantilever to a frame;
a rotator coupled to the first element distal from the second element; and
a fastener coupled to the rotator wherein the fastener is configured for removably coupling to an object such that the rotator is positioned for selectively rotating the object;
the first element comprising an upper section and a lower section, the upper section extending perpendicularly from the upper end of the second element, a first segment of the lower section extending perpendicularly from the second element proximate to the upper end of the second element, a second segment of the lower section extending transversely from the first segment to the upper section such that the lower section is positioned for bracing the upper section, the lower section comprising a third segment coupled to and extending between the first segment and the upper section such that the third segment abuts the second element.

2. The assembly of claim 1, further including the lower section comprising a fourth segment coupled to and extending from the second segment distal from the first segment such that the fourth segment abuts the upper section, the fourth segment being coupled to the upper section.

3. The assembly of claim 1, further comprising:
a pair of first holes positioned in the third segment of the lower section;
a pair of second holes positioned in the second element proximate to the upper end such that the second pair of holes is alignable with the pair of first holes;
a pair of bolts, each bolt being selectively insertable through a respective second hole and an associated first hole; and
a pair of nuts, each nut being selectively couplable to a respective bolt for removably coupling the second element to the first element.

4. The assembly of claim 1, further including the rotator comprising:
a housing defining an interior space;
a power module coupled to the housing and positioned in the interior space; and
a motor coupled to the housing and positioned in the interior space such that a shaft of the motor extends through a bottom of the housing, the motor being operationally coupled to the power module such that the power module is positioned for selectively powering the motor for rotating the shaft.

5. The assembly of claim 4, further including the power module comprising a power cord coupled to and extending from the housing wherein a plug of the power cord is configured for coupling to a source of electrical current.

6. The assembly of claim 4, further including the fastener comprising a coupling hook coupled to the shaft wherein the coupling hook is configured for selectively coupling to a ring coupled to the object for removably coupling the object to the shaft positioning the motor for rotating the object.

7. The assembly of claim 1, further comprising:
the lower section comprising a fourth segment coupled to and extending from the second segment distal from the first segment such that the fourth segment abuts the upper section, the fourth segment being coupled to the upper section, the second element comprising a lower segment coupled to and extending transversely from an upper segment, the second element being arcuate adjacent to a lower end of the second element defining a mounting hook;
a pair of first holes positioned in the third segment of the lower section;
a pair of second holes positioned in the second element proximate to the upper end such that the second pair of holes is alignable with the pair of first holes;
a pair of bolts, each bolt being selectively insertable through a respective second hole and an associated first hole;
a pair of nuts, each nut being selectively couplable to a respective bolt for removably coupling the second element to the first element;
the pair of couplers comprising a slot and the mounting hook, the slot being positioned in the first segment of the lower section of the first element proximate to the second element wherein mounting hook is configured for inserting a crossmember of the frame and the slot is configured for inserting a mounting bolt for coupling the cantilever to a mounting clamp coupled to the frame such that the first element extends substantially horizontally from the frame;
the rotator comprising:
a housing defining an interior space,
a power module coupled to the housing and positioned in the interior space, the power module comprising a power cord coupled to and extending from the housing wherein a plug of the power cord is configured for coupling to a source of electrical current, and
a motor coupled to the housing and positioned in the interior space such that a shaft of the motor extends through a bottom of the housing, the motor being operationally coupled to the power module such that the power module is positioned for selectively powering the motor for rotating the shaft;
the fastener comprising a coupling hook coupled to the shaft wherein the coupling hook is configured for selectively coupling to a ring coupled to the object for removably coupling the object to the shaft positioning the motor for rotating the object; and
an orifice positioned in the second segment of the lower section of the first element proximate to the upper section of the first element, the power cord being positioned through the orifice.

8. A frame mountable bracket assembly comprising:
a cantilever comprising a first element coupled to and extending perpendicularly from an upper end of a second element;
a pair of couplers coupled singly to the cantilever proximate to the upper end and a lower end of the second element wherein the pair of couplers is configured for removably coupling the cantilever to a frame;
a rotator coupled to the first element distal from the second element;
a fastener coupled to the rotator wherein the fastener is configured for removably coupling to an object such that the rotator is positioned for selectively rotating the object;
the first element comprising an upper section and a lower section, the upper section extending perpendicularly from the upper end of the second element, a first segment of the lower section extending perpendicularly from the second element proximate to the upper end of the second element, a second segment of the lower section extending transversely from the first segment to the upper section such that the lower section is positioned for bracing the upper section;
the second element comprising a lower segment coupled to and extending transversely from an upper segment, the second element being arcuate adjacent to the lower end of the second element defining a mounting hook; and
the pair of couplers comprising a slot and the mounting hook, the slot being positioned in the first segment of the lower section of the first element proximate to the second element wherein mounting hook is configured for inserting a crossmember of the frame and the slot is configured for inserting a mounting bolt for coupling the cantilever to a mounting clamp coupled to the frame such that the first element extends substantially horizontally from the frame.

9. A frame mountable bracket assembly comprising:
a cantilever comprising a first element coupled to and extending perpendicularly from an upper end of a second element;
a pair of couplers coupled singly to the cantilever proximate to the upper end and a lower end of the second element wherein the pair of couplers is configured for removably coupling the cantilever to a frame;
a rotator coupled to the first element distal from the second element, the rotator comprising:
a housing defining an interior space,
a power module coupled to the housing and positioned in the interior space, the power module comprising a power cord coupled to and extending from the housing wherein a plug of the power cord is configured for coupling to a source of electrical current, and
a motor coupled to the housing and positioned in the interior space such that a shaft of the motor extends through a bottom of the housing, the motor being operationally coupled to the power module such that the power module is positioned for selectively powering the motor for rotating the shaft;
a fastener coupled to the rotator wherein the fastener is configured for removably coupling to an object such that the rotator is positioned for selectively rotating the object;
the first element comprising an upper section and a lower section, the upper section extending perpendicularly from the upper end of the second element, a first segment of the lower section extending perpendicularly from the second element proximate to the upper end of the second element, a second segment of the lower section extending transversely from the first segment to the upper section such that the lower section is positioned for bracing the upper section; and
an orifice positioned in the second segment of the lower section of the first element proximate to the upper section of the first element, the power cord being positioned through the orifice.

\* \* \* \* \*